United States Patent [19]

Bowen et al.

[11] Patent Number: 4,534,616
[45] Date of Patent: Aug. 13, 1985

[54] FIBER OPTIC CONNECTOR HAVING LENS

[75] Inventors: Terry P. Bowen, Etters; Bernard G. Caron, Harrisburg both of Pa.; Ronald F. Cooper, Littleton, Mass. Douglas W. Glover, Harrisburg, Pa.

[73] Assignee: AMP Incorporated, Harrisburg, Pa.

[21] Appl. No.: 381,480

[22] Filed: May 24, 1982

[51] Int. Cl.³ .............................................. G02B 7/26
[52] U.S. Cl. .............................. 350/96.20; 350/96.18
[58] Field of Search ............... 350/96.18, 96.20, 96.21, 350/96.22

[56] References Cited

U.S. PATENT DOCUMENTS

| | | | |
|---|---|---|---|
| 3,510,641 | 5/1970 | Reynolds | 240/1 |
| 3,517,981 | 6/1970 | Rueger et al. | 350/96 |
| 3,649,098 | 3/1972 | Suverison | 350/96.18 |
| 4,183,618 | 1/1980 | Rush et al. | 350/96.18 |
| 4,273,413 | 6/1981 | Bendiksen et al. | 350/96.20 |
| 4,360,249 | 11/1982 | Slemon | 350/96.18 |
| 4,420,219 | 12/1983 | Muchel | 350/96.18 |
| 4,421,383 | 12/1983 | Carlsen | 350/96.21 |

FOREIGN PATENT DOCUMENTS 2722367 12/1977 Fed. Rep. of Germany ... 350/96.18
2334969 12/1975 France .

OTHER PUBLICATIONS

Archey et al., "Low Loss Optical Coupler", *IBM Tech. Discl. Bulletin,* vol. 22, No. 12, May 1980, pp. 5288-5290.
"Optical Spectra"-Oct. 1980-pp. 41-42, article entitled Connectors that Stretch, by Carlsen & Melman.

*Primary Examiner*—John Lee
*Attorney, Agent, or Firm*—Adrian J. LaRue; Anton P. Ness

[57] ABSTRACT

A fiber optic connector comprises a resilient ferrule member having a lens at a forward end which communicates with an internal bore in which a fiber optic transmission member is disposed with the end of the fiber optic transmission member being located substantially at the focal point of the lens. An index-matching material is located in the bore of the ferrule member to protect the fiber optic transmission member.

25 Claims, 7 Drawing Figures

FIBER OPTIC CONNECTOR HAVING LENS

FIELD OF THE INVENTION

This invention relates to fiber optic connectors and more particularly to fiber optic connectors having a lens.

BACKGROUND OF THE INVENTION

U.S. Pat. No. 3,999,837 discloses a fiber optic connector for terminating fiber optic transmission members. This connector is made of a plastic material having resilient characteristics so that when a ferrule member of the terminated connected is mateably secured in a profiled bore of a housing member, the profiled bore causes the ferrule member to snugly engage the fiber optic transmission member and to position the axis of the fiber optic transmission member coincident with the axis of the bore of the housing member and minimizes tolerances in the terminations and connections between fiber optic transmission members.

A similar fiber optic connector is disclosed in U.S. Pat. No. 4,186,996 for use in conjunction with light-transmitting or light-sensing members.

Whereas these connectors are effective for terminating and interconnecting fiber optic transmission members, misalignment, the gap between mated fiber optic connectors, and other tolerance factors constitute problems that detract from the effectiveness of the fiber optic connections, especially with respect to connections that demand very high performance requirements. The use of lenses as a part of the fiber optic connectors for terminating fiber optic transmission members minimizes these problems and substantially increases the performance capability of such connectors.

SUMMARY OF THE INVENTION

According to the present invention, a fiber optic connector comprises a ferrule member having a forward end and a back end, the forward end including a lens. The forward and back ends have a first bore along which a fiber optic transmission member can extend. A second bore in the forward end is coincident with the lens axis, is substantially smaller than the first bore, but is slightly larger than the diameter of the fiber optic transmission member which is to be disposed therein along with an index matching fluid. The second bore terminates at a surface which is located at the focal point of the lens. A beveled surface between the focal point surface and the bore enables fiber optic transmission members of different diameters to be accommodated therein.

According to another aspect of the present invention, the lens can be a separate element or an integral part of the ferrule member.

According to a further aspect of the present invention, a third bore extends from the front surface of the forward end of the ferrule member to the second bore in which a self-focusing lens is disposed; the end of the fiber optic transmission member is adapted to engage the inner end of the self-focusing lens which it is secured in the ferrule member.

DETAILED DESCRIPTION OF PREFERRED EMBODIMENTS

Figure 1:
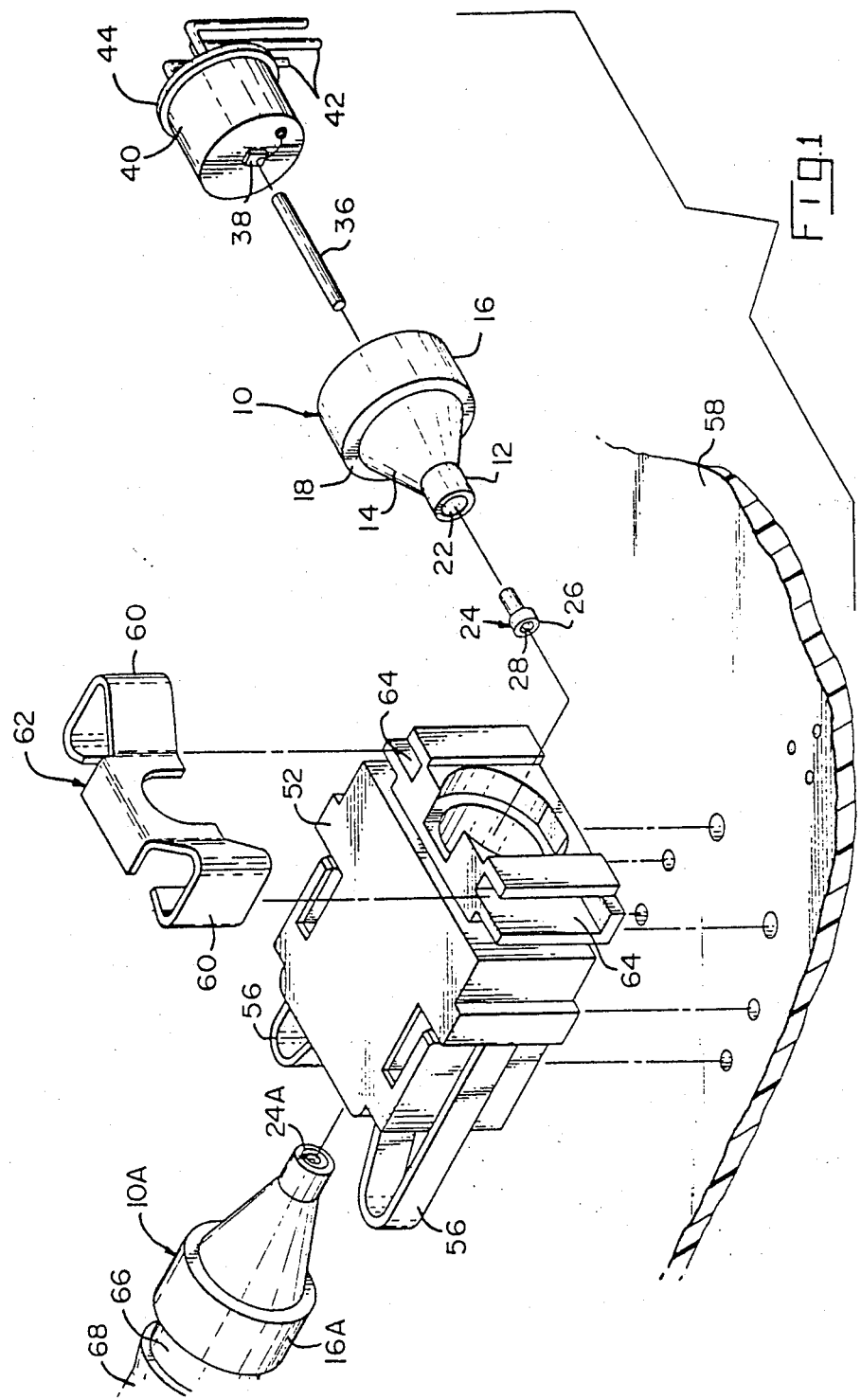
FIG. 1 is an exploded and perspective view of fiber optic connectors, a housing therefor, and an optoelectronic device.
Figure 2:
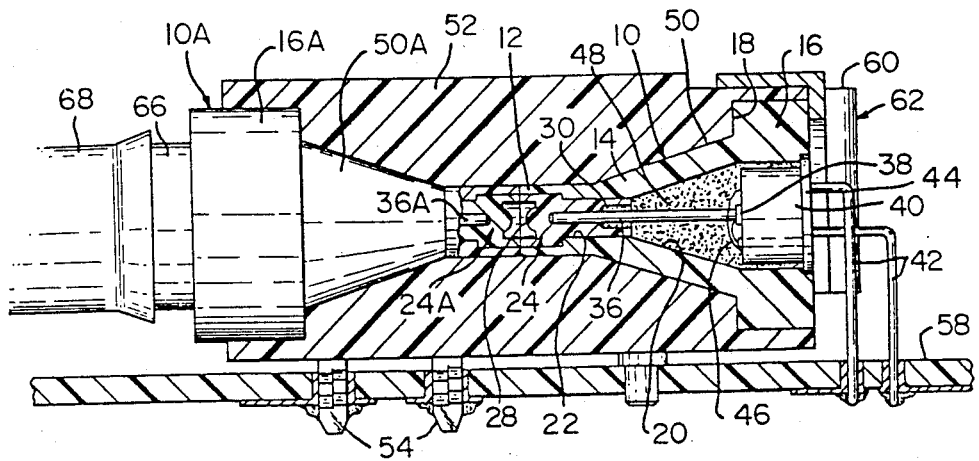
FIG. 2 is a part cross-sectional view of FIG. 1 in assembled condition.
Figure 3:
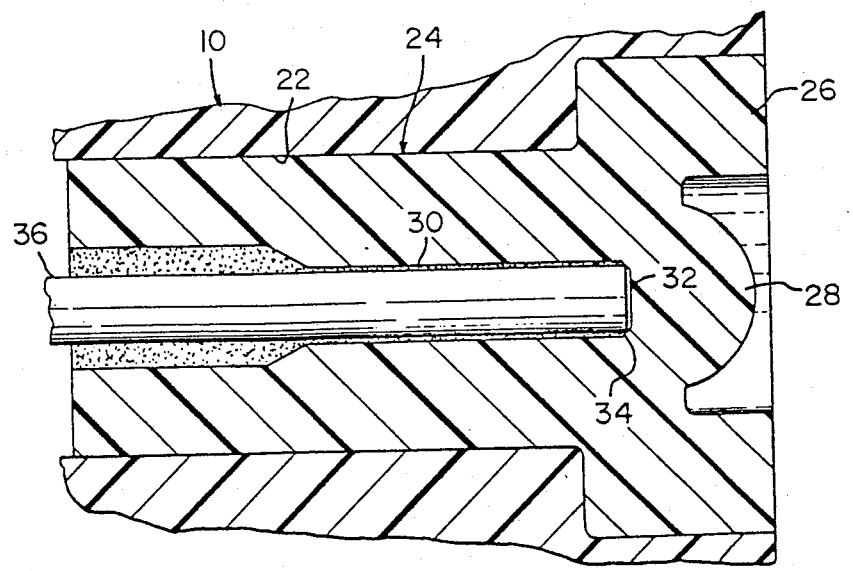
FIG. 3 is an enlarged part cross-sectional view of the lens.

FIGS. 1 and 2 illustrate a fiber optic connection arrangement between a terminated fiber optic transmission member of a fiber optic cable and an optical electronic device. Ferrule member 10 is of the type disclosed in U.S. Pat. No. 4,186,996, the disclosure of which is completely incorporated herein by reference. Ferrule member 10 is a resilient ferrule that is fabricated by molding from a suitable plastic material and includes a cylindrical section 12, a conical section 14, and a cylindrical body section 16. A stop surface 18 is located between conical section 14 and body section 16. Sections 14 and 16 have a profiled bore 20 therein which communicates with a stepped bore 22 located in cylindrical section 12 and the forward part of conical section 14. Lens 24 is secured in stepped bore 22 of ferrule member 10 by a force fit or a suitable adhesive. Lens 24 is preferably molded from a suitable plastic material for molding lenses. Lens 24 as best illustrated in FIG. 3 includes an annular section 26 surrounding an aspherical lens 28, the outermost part of which is spaced inwardly from the plane containing the outer surface of annular section 26. Aspherical lens 28 can be a Fresnel type lens if desired. Stepped bore 30 extends along lens member 24 with the axis thereof being coincident with the axis of lens member 24. The outer part of stepped bore 30 is larger in diameter than the inner part and a beveled surface interconnects these parts. Inner surface 32 of stepped bore 30 is located at the focal point of lens 28, the inner end of stepped bore 30 terminating at inner surface 32 via beveled surface 34.

The diameter of the inner part of stepped bore 30 is slightly larger than the diameter of fiber optic transmission member 36 which is in the form of a rod of sufficient length that extends from a light-transmitting or light-sensing chip 38 to beveled surface 34 on which the outer end of rod 36 engages. Chip 38 is secured onto can 40 which is a TO-18 or TO-46 type having electrical leads 42 extending outwardly from a base member 44 whose periphery extends outwardly beyond can 40.

In assembly, fiber optic rod 36 is adhered onto chip 38 by means of optically transparent adhesive 46 and can 40 with rod 36 secured thereon is positioned within profiled bore 20 which contains optically transparent potting material 48 thereby securing the can 40 and fiber optic rod 36 in position in ferrule member 10. Base member 44 engages a shoulder within ferrule member 10 to properly position can 40 within profiled bore 20 and fiber optic rod 36 in moving along the small diametered part of stepped bore 30 in lens member 24 expresses potting material 48 out of the way as the outer end of fiber optic rod 36 engages beveled surface 34 to position the end of fiber optic rod 36 at substantially the focal point of lens 28. If desired, stepped bore 30 of lens member 24 can be filled with an optically transparent gel and a potting compound which need not be optically transparent can be disposed in profiled bore 20 of ferrule member 10 thereby securing can 40 and fiber optic rod 36 in position in ferrule member 10. After can 40 and fiber optic rod 36 are properly secured in position in ferrule member 10, the assembly can be positioned within a profiled bore 50 within housing 52 that is of the type disclosed in U.S. patent application Ser. No. 381,445, filed May 24, 1982, the disclosure of which is completely incorporated herein by reference. Profiled bore 50 has a configuration to accommodate sections 12, 14, and 16 of ferrule member 10 so that when ferrule member 10 is positioned in bore 50, the resilient characteristics of ferrule member 10 will align the axis of the cylindrical inner section of bore 50 coincidently with the axis of ferrule member 10 and likewise the axis of lens 28. Legs 54 of latching members 56 of housing 52 and electrical leads 42 are soldered in position on printed circuit board 58 and arms 60 of latching and head sink member 62 are disposed in recesses 64 of housing 52 thereby securing the ferrule member 10 in position in profiled bore 50 of housing 52 and also serving as a heat sink for the optical electronic device.

Ferrule member 10A is similar in construction to that of ferrule member 10 except that it has a cylindrical section 66 on which a clamping ferrule 68 is disposed to crimpingly secure ferrule member 10A onto a fiber optic cable (not shown) according to the teaching of U.S. patent application Ser. No. 319,025 filed Nov. 6, 1981 or U.S. patent application Ser. No. 381,445 filed May 24, 1982. Fiber optic transmission 36A of the fiber optic cable terminated to ferrule member 10A is secured in ferrule member 10A and positioned in a lens member 24A in the same manner as that disclosed in conjunction with ferrule member 10 and lens member 24. After the fiber optic cable has been properly terminated in ferrule member 10A, ferrule member 10A is latchably secured in profiled bore 50A of housing 52 by latching members 56. Bores 50 and 50A of housing 52 axially align lens members 24 and 24A as a result of the resilient characteristics of the ferrule members. Other housings can be used to interconnect the ferrule members.

Figure 4:
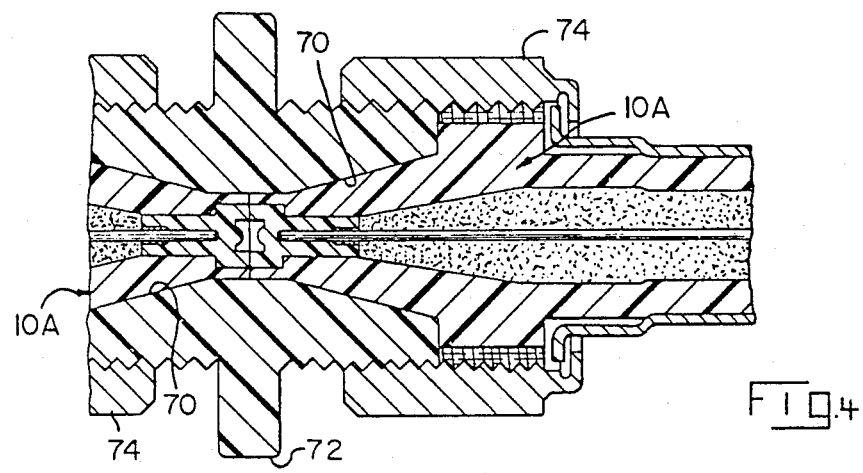
FIG. 4 is a cross-sectional view of an alternative embodiment.

FIG. 4 illustrates ferrule members 10A secured onto fiber optic transmission members and interconnected together within profiled bores 70 of a coupling member 72 by means of nut members 74 threadably mounted on coupling member 72, the resilient characteristics of the ferrule members axially aligning the lens members.

Figure 5:
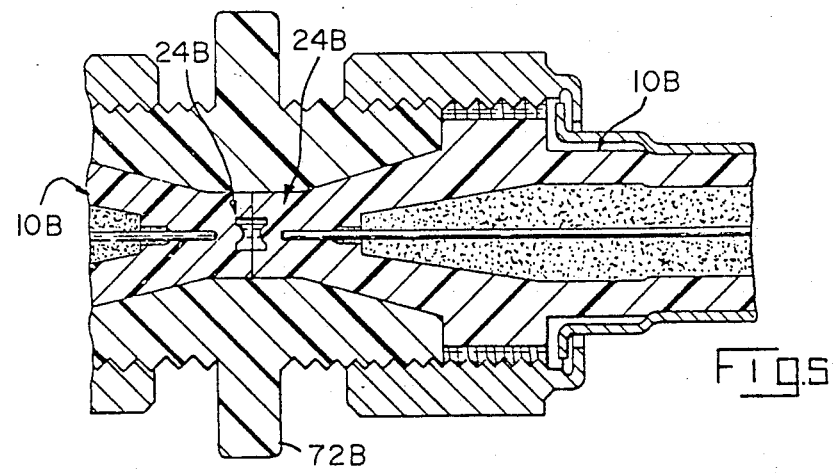
FIG. 5 is a cross-sectional view of a further embodiment.

FIG. 5 illustrates an additional embodiment of the present invention wherein ferrule members 10B have lens members 24B formed as integral members of ferrule members 10B when they are molded from a suitable material to form lens members 24B and to also have the resilient characteristics that ferrule members 10 and 10A have for axially aligning the lens members.

The use of lens members in conjunction with ferrule members for terminating fiber optic transmission members and to interconnect the fiber optic transmission members compensates for lateral misalignment and for the gap that takes place when the fiber optic transmission members are interconnected. The material in the stepped bore 30 of the lens member index matches the fiber optic transmission member to the lens member, provides replacement of buffer material surrounding the fiber optic transmission member to protect it, and cleans the end of the fiber optic transmission member by removing foreign particles when the fiber optic transmission member is inserted into the stepped bore of the lens member. The beveled surface 34 at the inner end of the stepped bore 30 serves as a stop surface for the end of the fiber optic transmission member, aligns axes of the fiber optic transmission member and the lens member, enables the bore to be larger for use of the index-matching material and permits the index-matching material to move out of the way during insertion of the fiber optic transmission member into the stepped bore. The use of the index-matching material will also minimize factors regarding scribe and break of the fiber optic transmission member so that the ends of the fiber optic transmission members need not be absolutely perfect. Annular sections 26 of the lens members prevents damage to the lens members when the lens members engage one another, the fiber optic transmission members will not be flexed during mating and unmating of the ferrule members, and the fiber optic transmission members will not be under constant stress when mated because the fiber optic transmission members will be in a passive state. The fiber optic transmission members encased in the lens members will preclude the problem of foreign particles affecting the transmission of light therealong, increased beam size is less sensitive to presence of foreign particles, and the lenses can be cleaned without damage to the fiber optic transmission members. Anti-reflective material can be coated onto the lens if desired.

The use of lenses in fiber optic connectors expands the light beam, collimates the expanded light beam to compensate for misalignment and tolerance problems, and minimizes end matching problems between fiber optic connectors.

Figures 6, 7:
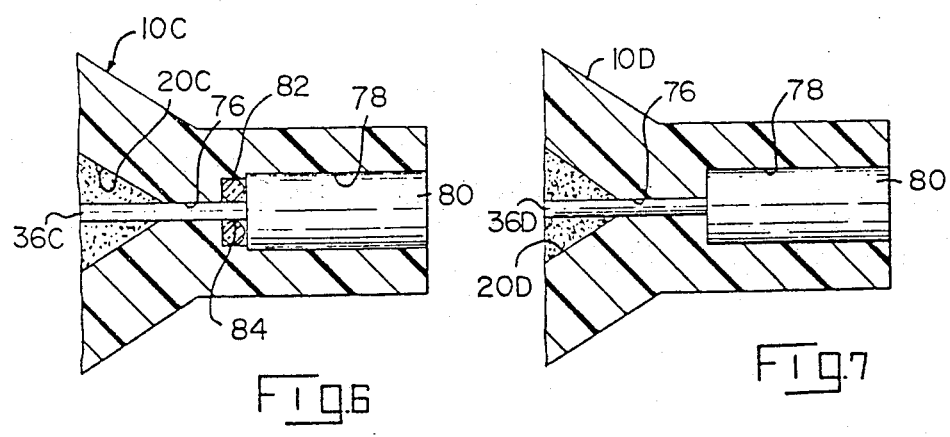
FIGS. 6 and 7 are part cross-sectional views of additional embodiments.

FIGS. 6 and 7 illustrate further embodiments of the present invention wherein ferrule member 10C of FIG. 6 has a stepped bore as a continuation of profiled bore 20C including a smaller diameter section 76 and a larger diameter section 78. A graded index self-focusing lens 80 is secured in larger diameter bore section 78 and has a sapphire, ceramic or the like material 82 with an opening 84 extending therethrough secured to the inner end of lens 80 in which the end of fiber optic transmission member 36C is disposed so that it is positioned against lens 80. The embodiment of FIG. 7 is similar to that of FIG. 6 except that the axis of bore section 76 is accurately coincident with the axis of bore section 78 so that the end of fiber optic transmission member 36D is positioned against graded index self-focusing lens 80 without the need for sapphire 82 to accurately position the end of the fiber optic transmission member against lens 80 as in FIG. 6.

We claim:
1. A fiber optic connector for terminating a fiber optic transmission means, comprising:
ferrule means of resilient plastic material having forward section means and rear section means, said forward section means and said rear section means having profiled bore means extending axially therealong, along which a fiber optic transmission means is to extend, said bore means having a first bore section means larger in diameter than the diameter of said fiber optic transmission means, and a lens-receiving bore means extending axially along said forward section means; and
lens means secured within said lens-receiving bore means in said forward section means, said lens means including a rear section having a stepped bore means extending axially and partially along therethrough ending in an inner surface located at the focal point of said lens means and at which the end of said fiber optic transmission means is located when positioned within said stepped bore means.

2. A fiber optic connector as set forth in claim 1 wherein at least a portion of said stepped bore means of said lens means terminating at said inner surface is only slightly larger in diameter than said diameter of said fiber optic transmission means.

3. A fiber optic connector as set forth in claim 1 wherein said stepped bore means in said lens means has an inner end terminating at said inner surface which inner end is only slightly larger in diameter than said diameter of said fiber optic transmission means, and further having an outer part larger in diameter than said inner end, and a beveled surface interconnects said outer part and said inner end.

4. A fiber optic connector as set forth in claim 1 wherein said inner surface of said stepped bore means of said lens means is axially normal thereto and includes a beveled surface extending between said inner surface and said stepped bore means.

5. A fiber optic connector as set forth in claim 1 wherein said lens means has an aspherical lens section surrounded by an annular section.

6. A fiber optic connector as set forth in claim 5 wherein said annular section extends farther forward than any portion of said aspherical lens section.

7. A fiber optic connector as set forth in claim 1 wherein an outer end of said fiber optic transmission means is secured to a photoactive member of an optical electronic device which is secured in said first bore section of said ferrule means.

8. A fiber optic connector as set forth in claim 1 wherein said ferrule means includes a cylindrical section into which an end of a fiber optic cable including said fiber optic transmission means is positioned and a crimping ferrule is crimpable onto said cylindrical section thereby securing said fiber optic cable end therein.

9. A fiber optic connector as set forth in claim 1 wherein index-matching material is located in said profiled bore means.

10. A fiber optic connector for terminating a fiber optic transmission means, comprising:
ferrule means of resilient plastic material having forward section means and rear section means, said forward section means and said rear section means having profiled bore means extending axially therealong, along which a fiber optic transmission means is to extend, said bore means having a first bore section means larger in diameter than the diameter of said fiber optic transmission means and having a lens-receiving bore means extending axially along said forward section means, and further having communicatingly therebetween a second bore section means only slightly larger in diameter than the diameter of said fiber optic transmission means; and
lens means secured within said lens-receiving bore means in said forward section means such that an end of said fiber optic transmission means is located at the focal point of said lens means when positioned within said profiled bore means of said ferrule means.

11. A fiber optic connector as set forth in claim 10 wherein said lens means is a graded index lens having a sapphire, ceramic or the like material secured to an inner surface of said lens, said sapphire, ceramic or the like material having a central opening into which said end of said fiber optic transmission means is to be positioned.

12. A fiber optic connector as set forth in claim 10 wherein said lens means is a graded index lens and said second bore section means is a precision bore, the axis of which is accurately coincident with the axis of said graded index lens.

13. A fiber optic connector as set forth in claim 10 wherein said lens means does not extend forward of said forward section means of said ferrule means.

14. A fiber optic connector as set forth in claim 10 wherein index-matching material is located in said profiled bore means.

15. A fiber optic connector as set forth in claim 10 wherein an outer end of said fiber transmission means is secured to a photoactive member of an optical electronic device which is secured in said first bore section means of said ferrule means.

16. A fiber optic connector as set forth in claim 10 wherein said ferrule means includes a cylindrical section into which an end of a fiber optic cable including said fiber optic transmission means is positioned and a crimping ferrule is crimpable onto said cylindrical section thereby securing said fiber optic cable end therein.

17. A fiber optic connector for terminating a fiber optic transmission means, comprising a ferrule means of resilient plastic material having forward section means and rear section means, said rear section means having profiled bore means extending axially therealong, along which a fiber optic transmission means is to extend, said bore means having a first bore section means larger in diameter than the diameter of said fiber optic transmission means, said forward section means having a stepped bore means extending axially and partially therethrough ending in an inner surface at which the end of said fiber optic transmission means is located when positioned within said stepped bore means, said forward section means including a lens means, with said inner surface of said stepped bore means being located at the focal point of said lens means, and said lens means has an aspherical lens section surrounded by an annular section.

18. A fiber optic connector as set forth in claim 17 wherein said lens means is integral with said ferrule means.

19. A fiber optic connector as set forth in claim 17 wherein at least a portion of said stepped bore means of said forward section means terminating at said inner surface is only slightly larger in diameter than said diameter of said fiber optic transmission means.

20. A fiber optic connector as set forth in claim 17 wherein said stepped bore means in said forward section means has an inner end terminating at said inner surface which inner end is only slightly larger in diameter than said diameter of said fiber optic transmission means, and further having an outer part larger in diameter than said inner end, and a beveled surface interconnects said outer part and said inner end.

21. A fiber optic connector as set forth in claim 17 wherein said inner surface of said stepped bore means of said forward section means is axially normal thereto and includes a beveled surface extending between said inner surface and said stepped bore means.

22. A fiber optic connector as set forth in claim 17 wherein said annular section extends farther forward than any portion of said aspherical lens section.

23. A fiber optic connector as set forth in claim 17 wherein an outer end of said fiber optic transmission means is secured to a photoactive member of an optical electronic device which is secured in said first bore section means of said ferrule means.

24. A fiber optic connector as set forth in claim 17 wherein said ferrule means includes a cylindrical section into which an end of a fiber optic cable including said fiber optic transmission means is positioned and a crimping ferrule is crimpable onto said cylindrical section thereby securing said fiber optic cable end therein.

25. A fiber optic connector as set forth in claim 17 wherein index-matching material is located in said profiled bore means.

* * * * *